No. 794,240. PATENTED JULY 11, 1905.
A. MEISTER & A. JUNKER.
ELECTRIC STORAGE BATTERY.
APPLICATION FILED NOV. 11, 1901.
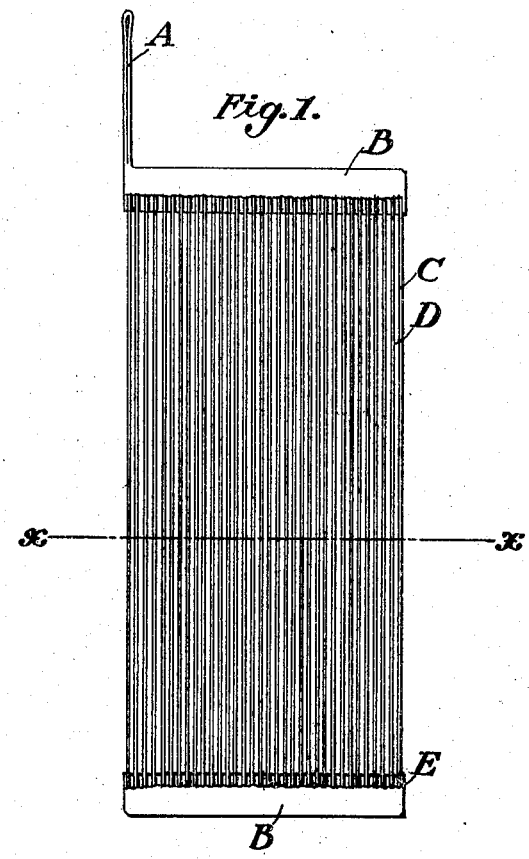
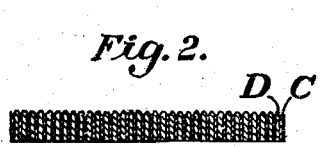
Witnesses
Robert Reichstadt.
Robert E. Linden
Inventors
August Meister
Alois Junker No. 794,240. Patented July 11, 1905.

UNITED STATES PATENT OFFICE.

AUGUST MEISTER AND ALOIS JUNKER, OF NEW YORK, N. Y.

ELECTRIC STORAGE BATTERY.

SPECIFICATION forming part of Letters Patent No. 794,240, dated July 11, 1905.

Application filed November 11, 1901. Serial No. 81,949.

*To all whom it may concern:*

Be it known that we, AUGUST MEISTER and ALOIS JUNKER, citizens of the United States, residing at New York, in the county of New York, State of New York, have invented Improvements in Electric Storage Batteries, of which the following is a specification.

This invention relates to electric storage batteries or accumulators; and it has special relation to a nickel anode with a coating thereon of an oxid of nickel formed electrochemically on the plate by means of a new construction and a new process.

The object of our invention is to provide a simple and improved battery which will have a longer life than the lead battery and which will be convenient, effective, and of maximum efficiency.

In the drawings, Figure 1 is a front view of the plate embodying one of the improvements. Fig. 2 is a sectional view.

Referring to the drawings, C designates one of the metallic sheet-nickel strips about one thirty-second of an inch thick and one-fourth of an inch wide and six inches long, a number of these strips lying in flat and parallel position and leaving an open space between them of about one thirty-second of an inch.

D designates a strip of the same size as the nickel strips, but consisting of sheet pulp, asbestos, or any other porous and absorbing material. These strips fill the space between the nickel strips.

B designates the soldering, where all the metallic strips are connected together by hard or soft solder on the top and bottom.

A is the connecting-pole strip of sheet-nickel soldered to the plate and having electrical connection with all metallic parts of the plate. E is a strip of nickel, which is also soldered on the bottom of the plate and relates to the same thing described in B.

Fig. 2 is a sectional view of the plate, in which C is the nickel strip and D is a layer of pulp or other absorbing and porous material between the nickel strips. If such a plate is used as an anode in a weak solution of caustic potash containing a small quantity of phenylate and another plate of sheet-nickel as a dummy electrode and an electric current passed through of about one ampere per square inch of the anode-surface, an oxid of nickel will be formed on the nickel anode. Such electrically-formed nickel plate acts successfully as a negative electrode in accumulators of the type of nickel-iron using an alkaline solution as electrolyte.

Having thus described our invention, we claim and desire to secure by Letters Patent—

1. A means for electrolytically forming an oxid coating on a nickel electrode, consisting of a nickel anode, a porous and absorbing material covering the surface of said anode, an electrolyte composed of diluted caustic potash and carbolic acid and a suitable cathode substantially as described.

2. A means for electrolytically forming an oxid coating on a metal electrode, consisting of a metal anode, a porous and absorbing material covering the surface of said anode, an electrolyte composed of dilute caustic potash and carbolic acid and a suitable cathode, substantially as described.

3. A means for electrolytically forming an oxid coating on a nickel electrode consisting of a nickel anode, a porous and absorbing material covering the surface of said anode, an electrolyte composed of dilute caustic potash and a phenolate and a suitable cathode substantially as described.

4. A means for electrolytically forming an oxid coating on a metal electrode consisting of a metal anode, a porous and absorbing material covering the surface of said anode, an electrolyte composed of dilute caustic potash, and a phenolate, and a suitable cathode substantially as described.

AUGUST MEISTER.
ALOIS JUNKER.

Witnesses:
EDW. HUBBERS,
ALBERT E. WOLL.